Patented July 27, 1948

2,446,145

UNITED STATES PATENT OFFICE 2,446,145

CARBONATE-HALOFORMATE OF GLYCEROL AND METHOD OF PRODUCING SAME

Franklin Strain, Norton Center, Ohio, assignor to Pittsburgh Plate Glass Company, Allegheny County, Pa., a corporation of Pennsylvania No Drawing. Application November 19, 1946, Serial No. 710,937

7 Claims. (Cl. 260—338)

This invention relates to a novel chloroformate. In accordance with the present invention a mixed carbonate-chloroformate of glycerol has been prepared wherein two hydroxy groups of the glycerol are esterified by carbonic acid and one hydroxy group of the glycerol is esterified with chloroformic acid. This product is prepared by reaction of phosgene with glycerol in the absence of hydrogen acceptors such as alkali metal or alkaline earth metal hydroxides or carbonates or other inorganic or organic bases and basic amines (pyridine, NaOH, Na2CO3, CaOH, etc.) which tend to react with chloroformates to remove the chlorine therefrom.

The reaction of the phosgene and glycerol is complicated by the fact that these two reactants are essentially immiscible and consequently essentialy no reaction tends to occur unless special efforts are resorted to in order to secure intimate contact between the phosgene and glycerol. This contact may be effected by vigorously agitating a reaction mixture containing these two reactants and continuing the agitation over a period of several hours. Contact of the rectants is facilitated and the rate of reaction is considerably increased by use of a mutual solvent for glycerol and phosgene. A particularly effective solvent for this purpose is the mixed carbonate-chloroformate ester herein contemplated. Consequently the rate of reaction is materially increased after a concentration of the desired mixed ester has been secured and in general it is desirable to initiate the reaction in the presence of an initial amount of this mixed ester.

Other mutual solvents particularly other normally liquid organic chloroformates may be used to facilitate the reaction. Thus alkyl chloroformates such as methyl, ethyl, n-propyl, n-butyl or isobutyl chloroformate, alkenyl or alkynyl chloroformates such as allyl, methallyl, propargyl, cinnamyl chloroformates, etc., or glycol dichloroformates such as diethylene glycol dichloroformate, or aromatic chloroformates such as phenol or resorcinol chloroformates are suitable solvents for this purpose.

The process may be conducted at temperatures above about 0° but preferably not in excess of about 60° C. While some reaction can be secured at temperature below 0° C., other chloroformates such as glycerol bis-chloroformate tend to be produced at such temperatures and in any event the reaction is generally unduly slow. Temperatures above about 60° C. are, in general, undesirable because decomposition of the mixed ester tends to occur at least to some degree at such elevated temperatures.

The process normally is conducted by vigorously agitating the reactants in a reaction vessel provided with suitable means for introducing separately phosgene and glycerol and also provided with a reflux condenser capable of condensing phosgene gas and returning it to the reaction vessel. For example, the process may be performed by introducing both liquid phosgene and glycerol into a reactor and vigorously agitating the mixture over a period of several hours usually in the presence of a mutual solvent, as above described. Furthermore the process may be performed by establishing a pool of liquid phosgene and solvent and adding glycerol thereto. Approximately two moles of phosgene is required per mole of glycerol and in most cases addition of the two reactants to the reaction vessel is controlled so that the glycerol remains in slight excess until the process is essentially complete. Some excess phosgene may be added toward the end of the reaction if desired in order to increase the yield.

The products secured by the process depend to a degree upon the temperature of reaction. Thus glyceryl bischloroformate tends to form to a some degree at low temperature, for example, below 0° C. whereas byproducts of the decomposition of the mixed ester are formed at elevated temperatures above 60° C. Within the temperature range of 0 to 60° C., the primary product obtained is 2,3-carbonyldioxypropyl chloroformate, although other isomers of this ester are obtained in small amount.

The following examples are illustrated.

Example I

A reaction flask was immersed in a 30° C. water bath and was provided with separate inlets for glycerol and liquid phosgene, an agitator and a reflux condenser cooled by a dry ice-acetone mixture. One mole of glycerol and two moles of liquid phosgene were slowly introduced into the reaction vessel while vigorously agitating the mixture. The rate of addition of the phosgene was controlled to maintain the reaction temperature at about 30° C. When addition of the phosgene and glycerol was complete, 0.2 mole of excess liquid phosgene was added and the mixture was allowed to stand with continuous vigorous agitation at 30° C. for about six hours. Thereafter the reaction mixture was dissolved in methylene chloride, washed four times with water and dried over calcum chloride. The resulting product was then heated in vacuo to distill away the solvent and a 90% yield of a mixed carbonate chloroformate ester which was predominately 2,3-carbonyl-dioxypropyl chloroformate was secured. This compound has the probable structure:

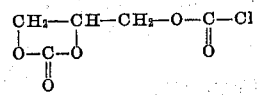

This mixed carbonate chloroformate is a mobile, slightly viscous liquid which is light yellow to colorless. The product sets to a hard brittle glass when cooled to −20 to −25° C. The liquid cannot be distilled. The mixed ester has an index of refraction $n_D^{20}$ of 1.4677 and a density, $d_4^{20}$, of about 1.5187. It decomposes on heating to about 150° C. It reacts with ammonia solutions at room temperature to produce 2,3-carbonyldioxypropyl carbamate and with amines such as aniline, stearyl or lauryl amine, etc., to form the urethanes.

*Example II*

Ninety gms. of 2,3-carbonyldioxypropyl chloroformate prepared in Example I was introduced into a three-neck flask immersed in a 30–40° water bath and provided with an agitator, inlets for liquid phosgene and glycerol and a reflux condenser cooled by a dry ice-acetone mixture. One-half mole of glycerol and 1.1 moles of liquid phosgene were slowly introduced into the flask, the rate of addition of the reactants being controlled to maintain the temperature of about 30 to 40° C. After addition of the reactants was complete the mixture was allowed to stand at 30° C. with continued agitation for eight hours and was degassed by heating about 90° C. for 15 minutes. The product was dissolved in methylene chloride and washed and purified by distillation of the solvent as in Example I. A 97% yield of the mixed carbonate-chloroformate ester of glycerol was secured.

While the invention has been desired with particular reference to the production of chloroformates it is not limited thereto since other corresponding haloformates may be prepared in the same manner. For example, the corresponding bromoformate may be prepared by substitution of carbonyl bromide in lieu of phosgene in the above described process with the consequent production of the compound

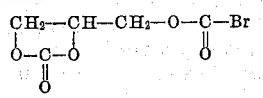

and its homologues.

Although the present invention has been described with reference to certain details of specific improvements it is not intended that such details shall be regarded as limitation upon the scope of the invention except insofar as included in the accompanying claims.

I claim:
1. A mixed carbonate-chloroformate of glycerol wherein two hydroxy groups of the glycerol are esterified by carbonic acid and one hydroxy group of the glycerol is esterified by chloroformic acid.
2. A mixed carbonate-haloformate of glycerol wherein two hydroxy groups of the glycerol are esterified by carbonic acid and one hydroxy group of the glycerol is esterified by a haloformic acid of the group consisting of chloroformic and bromoformic acids.
3. The compound

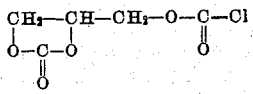

4. A method of preparing a mixed carbonate-chloroformate of glycerol which comprises maintaining phosgene and glycerol substantially in the proportion of two mols of phosgene per mol of glycerol in intimate contact at a temperature of 0 to 60° C. until the carbonate-haloformate compound has been formed.
5. A method of preparing a mixed carbonate-chloroformate of glycerol which comprises reacting glycerol and phosgene in the presence of a mutual solvent therefor at a temperature above 0° C. and below the temperature at which substantial decomposition of the mixed carbonate-chloroformate tends to occur.
6. A method of preparing a mixed carbonate-chloroformate of glycerol which comprises reacting glycerol and phosgene in the presence of an organic chloroformate at a temperature of 0 to 60° C.
7. A method of preparing a mixed carbonate-chloroformate of glycerol which comprises reacting glycerol and phosgene substantially in the proportion of two mols of phosgene per mol of glycerol in the presence of 2,3-carbonyldioxypropyl chloroformate.

FRANKLIN STRAIN.

REFERENCES CITED

The following references are of record in the file of this patent:

UNITED STATES PATENTS

| Number | Name | Date |
| --- | --- | --- |
| 2,397,630 | Strain | Apr. 2, 1946 |